United States Patent Office 3,737,499
Patented June 5, 1973

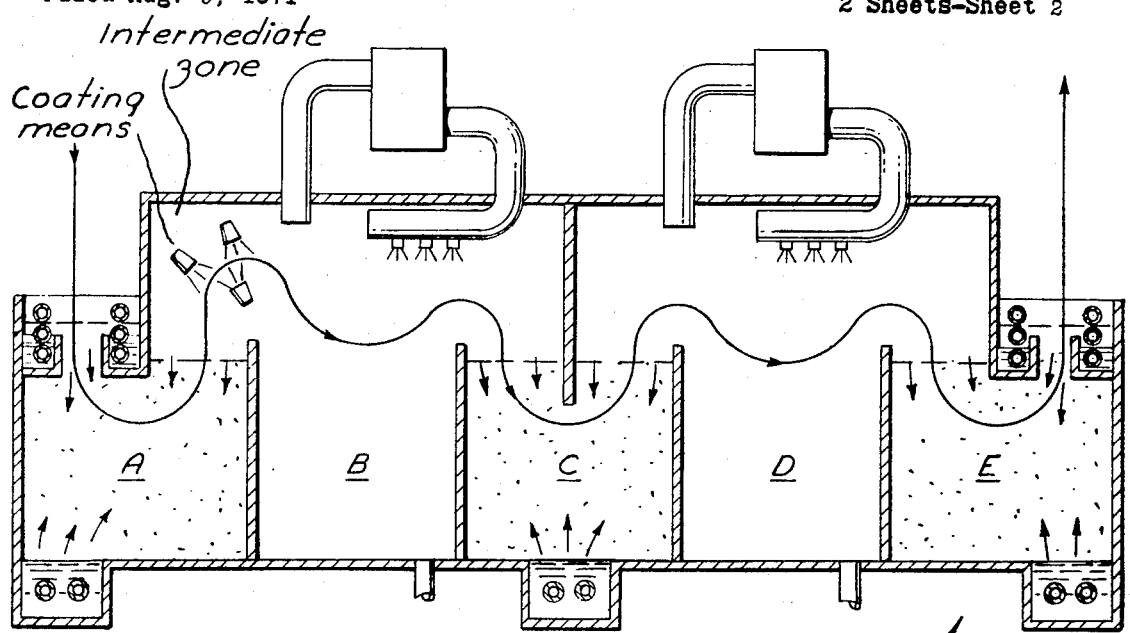
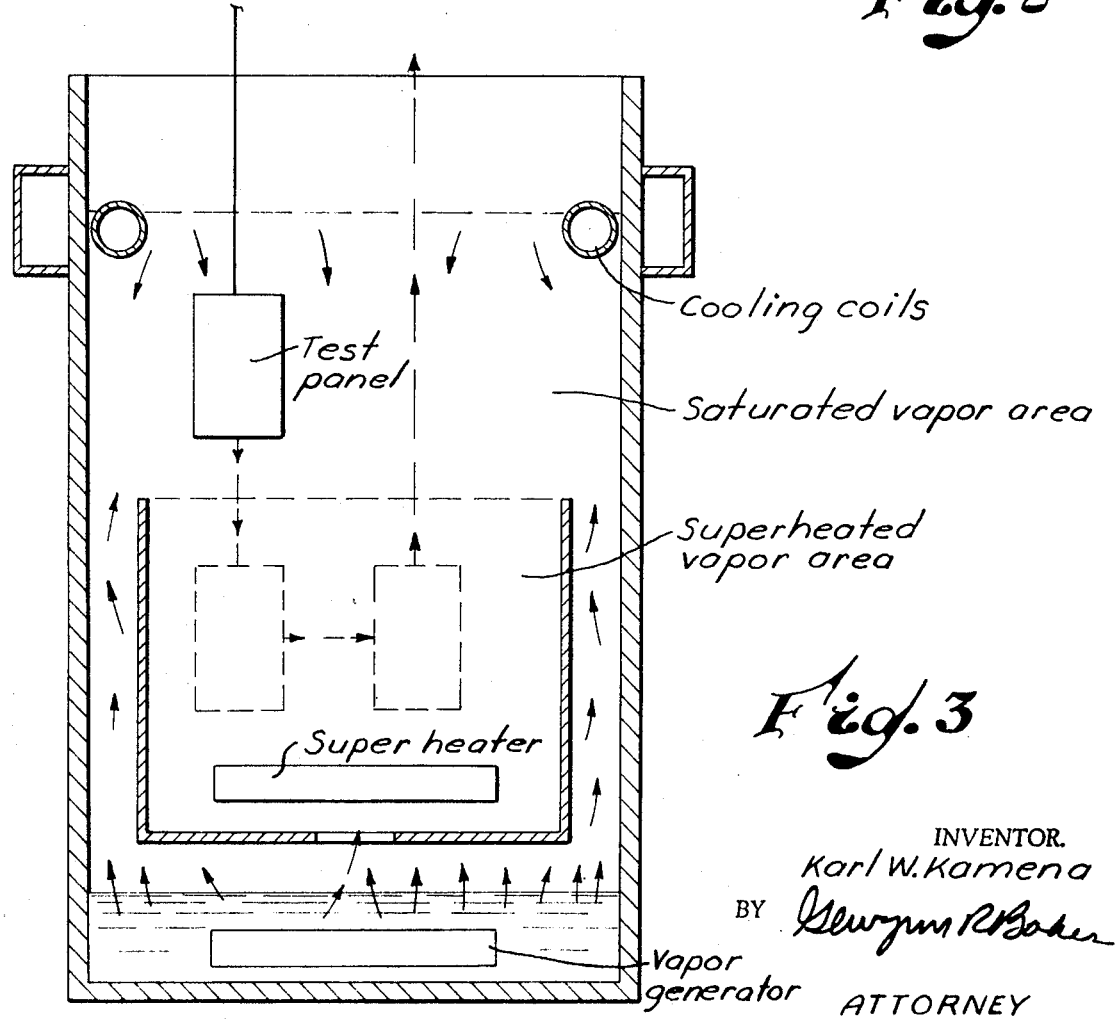

3,737,499
METHOD FOR MODIFYING PLASTIC SURFACES
Karl W. Kamena, Midland, Mich., assignor to The Dow Chemical Company, Midland, Mich.
Filed Aug. 9, 1971, Ser. No. 170,107
Int. Cl. B29c 25/00
U.S. Cl. 264—134                    2 Claims

ABSTRACT OF THE DISCLOSURE

A method for modifying a plastic surface of a body by exposing the surface to a gaseous solvent atmosphere whereby the solvent is absorbed into the surface, regulating the amount of absorption by controlling the temperature differential between the body surface and the solvent atmosphere, introducing the treated body surface into a second gaseous solvent atmosphere which is maintained at a temperature above the temperature of the treated body surface and withdrawing the body from the treating zones thereby removing substantially all surface blemishes. A method for coating to establish the plastic surface prior to modification, but in the same apparatus, is also provided.

BACKGROUND OF THE INVENTION

Figure 1:
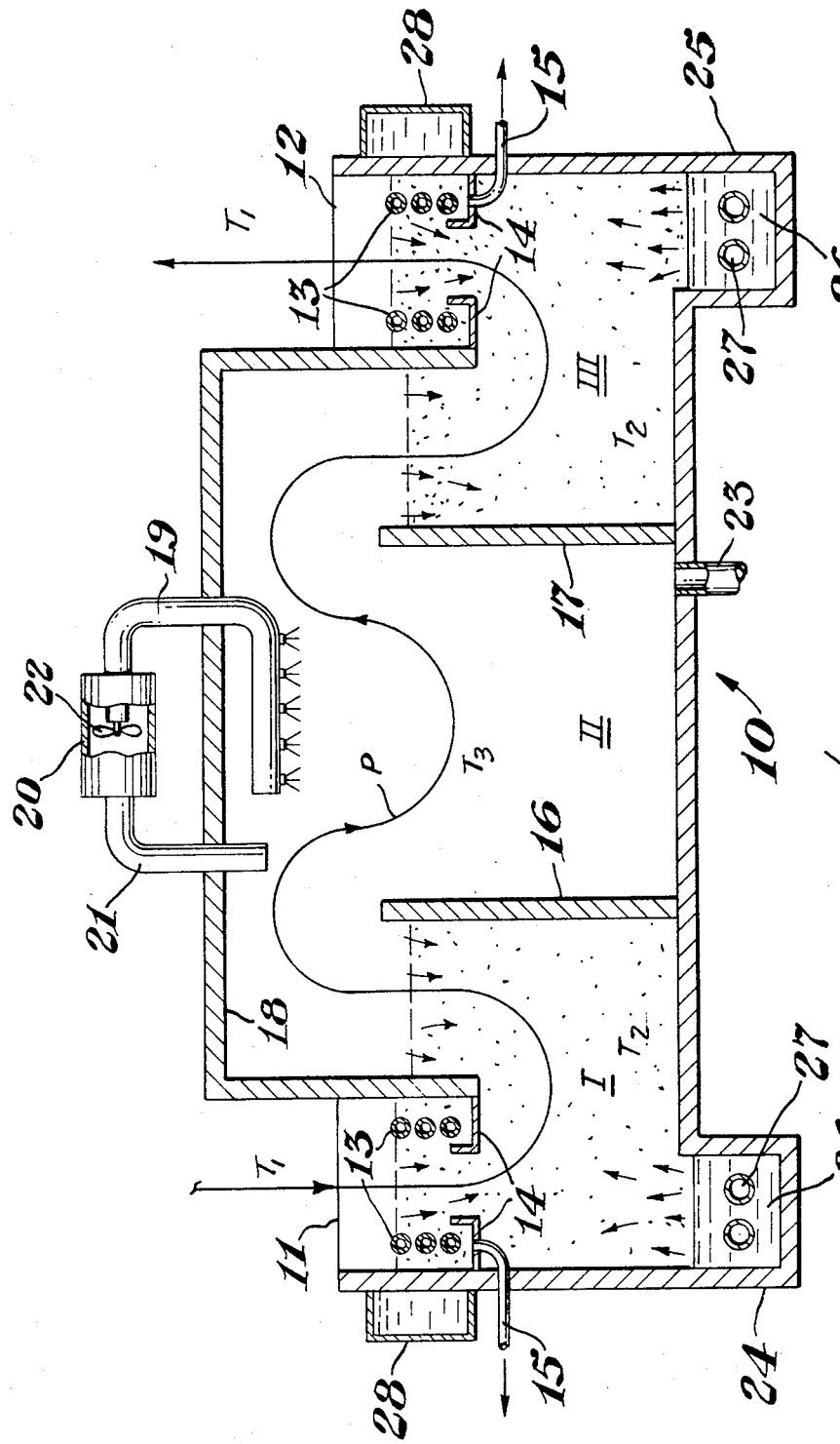

The coating industry and the plastics industry have always had some difficulty obtaining smooth, level, high gloss coatings or surfaces without exercising extreme care in application or manufacture usually accompanied by polishing, buffing or thermal bake techniques. These procedures are time consuming and expensive. A recent development for refinishing a plastic surface, for example, telephone parts such as head sets, housings, etc., is disclosed in British Pat. 1,165,176. The surface is reflowed by spraying a solvent against the plastic surface to remove oxidized plastic and to dissolve uncovered plastic which, upon removal of the solvent, will form a new or fresh surface of clean plastic. Optional treatment after spraying with solvent vapor permits a penetration of the liquid solvent deeper into the article. Drying is merely by use of air. Little or not effort has been expended to recover the solvents. Likewise little or no effort has been put forth to reflow large bodies, as for example, painted car bodies.

It is, therefore, an object of the present invention to provide a process for vapor reflow of plastic and plastic coated bodies without loss of solvent and without regard to size of the body.

It is also an object to provide a method whereby a coating may be applied in a solvent atmosphere and then reflowed in the same apparatus.

BRIEF DESCRIPTION OF THE INVENTION

The process of the present invention comprises introducing an object made of a plastic material, or an object which has a plastic surface, into a zone of vapors of a halogenated solvent. The object is at a temperature below, at or above the temperature of solvent vapors in the zone. The object is maintained in a zone of vapors of a solvent for said plastic material for a time sufficient for at least a molecular layer of the vapors to absorb into the surface. The object is then withdrawn from the vapor zone and introduced into a zone of superheated vapors of the solvent. The object is maintained within said superheated zone until its surface temperature is raised to at least about the temperature of said vapors. The object is then withdrawn from the superheated zone into and through a zone of saturated vapors of the solvent, without delay, and then into the ambient atmosphere. The saturated vapors in the last zone are maintained at their atmospheric boiling point. The object, upon withdrawal from the process, has had substantially all surface blemishes, such as scratches, nicks, runs, etc., removed, i.e., the process has leveled the surface defects.

The process recovers substantially all of the solvents employed by virtue of its ability to be operated in, for instance, an apparatus open to the atmosphere at each end for introduction and withdrawal of the object into and out of the apparatus. Each opening is provided with a cooling means to prevent the escape of vapors to the ambient atmosphere and has a means to collect vapors in excess of those necessary to fill the apparatus.

The process of the present invention further comprises a dual operation wherein (1) an object is coated with a suitable solvent-soluble coating and (2) the coating so applied is then reflowed to provide a surface free from blemishes. The solvent utilized in both operations is recovered as in the reflowing operation above.

DETAILED DESCRIPTION OF THE INVENTION

FIG. 1 represents a cross-sectional view of one embodiment of an apparatus for carrying out the process of the present invention to reflow a plastic surface; FIG. 2 represents a cross-sectional view of an embodiment of an apparatus for carrying out a coating and reflow process in accordance with the present invention; and FIG. 3 is a cross-sectional view of an apparatus for coating and/or reflowing panels in accordance with the present invention.

In order to more fully understand the process of the present invention, it will be convenient to make reference to an apparatus for conducting the process. Therefore, an apparatus which may be employed in carrying out the invention will be first described. As illustrated in FIG. 1 of the drawings, there is provided a box-like structure 10, having an opening 11, which will be designated the entrance or inlet, and an opening 12, which will be designated an outlet or exit, at opposite ends of the structure 10. Surrounding the interior of each opening 11 and 12, is a coil 13 or a series of coils 13 through which a cooling medium can flow. Below the coil 13 or series of coils 13 located to collect any liquid which condenses on the coil or coils 13 is a trough 14. The trough 14 is connected through drain pipe 15 to deliver any condensate to storage or a vapor regenerating source. The interior of the box-like structure 10 is divided into three zones, labelled from left to right I, II and III, by interior walls 16 and 17 extending from the lower portion of the interior of structure 10 to a point above the coils 13.

Located within the intermediate zone II, and shown in the figure near the roof 18 of the structure 10 is a vapor distributing duct(s) 19 which extends across the upper portion of zone II. These ducts 19 are supplied with a superheated vapor from superheater 20 which drains vapors from zone II through ducting 21. The withdrawal of vapors from zone II may be accelerated by means of a pump or fan 22. A drain 23 is provided in the bottom of zone II to enable withdrawal of any condensate which may collect.

Each of zones I and III are provided with a sump 24 and 25 which contains a liquid 26. Each sump 24 and 25 is provided with a heating means 27 which may be a steam coil, electrical coil or a direct fired heater. The exterior surfaces of the structure 10 are preferably insulated. Also, the exit 12 and entrance 11 may be provided with a cold wall 28 which is located exterior of the walls of the structure at about the midpoint of the exterior wall coils 13 at each end.

It is to be understood that various means can be employed to generate the vapors both in entrance zone I and exit zone III. For example, in place of the boiling sumps 24 and 25 an external boiler may be employed to generate the vapors, and the vapors may be directed through appropriate tubing or piping to each zone.

The generation of superheated vapors in intermediate zone II, necessary to enable successful operation of the reflow process, can likewise be supplied in various ways. For example, rather than return vapors withdrawn from intermediate zone II to means 20, the vapors withdrawn may be condensed, heated in an external boiler, then the vapors superheated and returned to the zone. It is also possible to operate the apparatus in such a manner that all of the vapors in the intermediate zone II gradually circulate to saturated zones I and III, are condensed, collected and returned after heating to intermediate zone II as superheated vapors. The superheated vapors may be also generated by infrared heat, resistive heating, induction heating, or the like, on the surface of the object, which raises the temperature of the surface sufficiently to impart superheat to the vapors in the immediate vicinity of the surface.

The reflow method of the present invention contemplates the use of an apparatus incorporating the foregoing principles. The method preferably comprises introducing an object, which is a plastic body or has a plastic surface, through the entrance 11 into the zone of saturated solvent vapors (zone I). The object is introduced at a temperature $T_1$ which is a temperature below, at or above the temperature $T_2$ of the saturated solvent vapors in zone I (e.g., the atmospheric boiling temperature of the solvent). The exact temperature of the object is regulated to be below, at or above the temperature $T_2$ based upon the severity or degree of reflow required. Thus, if severe reflow is required, the temperature $T_1$ of the object should be somewhat below the solvent vapor temperature $T_2$ in order to permit a greater quantity of solvent vapor to be absorbed into the surface and thus fluidize the surface to a greater degree. Conversely, if the degree of reflow required is small, then only a small amount of solvent is needed to be absorbed, and therefore, the temperature of the object should preferably be at or above the solvent vapor temperature $T_2$. The amount of solvent absorbed into the surface of the object, or the amount of reflow, is regulated by (1) the temperature differential between the surface temperature $T_1$ of the incoming object and the temperature $T_2$ of the solvent vapors in zone I; (2) the residence time of the object in said zone I; (3) the solvent used; (4) the nature of the coating, i.e., its condition and thickness, composition, etc.; and (5) the nature of the substrate, i.e., its thickness, material of construction, etc. When considering temperature of the object, the bulk temperature is the preferred basis for use in determining temperature differential from the various atmospheres. However, in certain instances, the surface temperature may be employed as a basis for determining the temperature differentials. The object passes through zone I along path P and is maintained in zone I for a period of time sufficient for at least a molecular layer of solvent to be absorbed into the plastic surface of said object.

The object then passes into zone II over barrier wall 16, wherein it is subject to superheated vapors of the same solvent as utilized in zone I for a time sufficient to at least raise the surface temperature of the object to about the temperature $T_3$ of the superheated vapors, thereby removing, by vaporization, substantially all the solvent absorbed into the surface in zone I.

The object next passes into zone III over barrier wall 17 and, without delay, through zone III, into the atmosphere through exit 14, zone III being filled with saturated vapors of the same solvent as previously used which are at temperatures $T_2$. Passage through zone III may in some instances cool the object. However, condensation of vapor onto the object does not occur since the object's surface temperature is above the solvent vapor temperature in zone III. Therefore, the part is withdrawn from the apparatus in a substantially dry state.

The reflow process of this invention, then, provides a method for eliminating surface flaws from plastic surfaces with the advantages of quick drying and low solvent losses due to efficient solvent recovery and the ability of zones I and III to prevent the loss of superheated vapors from zone II.

Suitable solvents are the single volatile solvents which include halohydrocarbon solvents, such as the chlorinated hydrocarbon solvents (methylene chloride, dichloroethane, 1,1,1-trichloroethane, trichloroethylene, perchloroethylene and the like); the fluorinated hydrocarbon solvents (trichlorofluoromethane, trichlorotrifluoroethane, dibromotetrafluoroethane, tetrachlorodifluoroethane). The hydrocarbon solvents, such as benzene, naphtha, Stoddard solvent would be suitable except for their flammability. They may be used as mixture with the halogenated hydrocarbons in proportions to make the liquid and vapors substantially nonflammable.

The scope of plastics or plastic surfaces which can be reflowed in accordance with the present invention is broad and includes any organic material that may be placed in a flowable or semi-flowable state under the influence of an organic solvent and/or heat. While most materials are thermoplastic in nature, both linear or substantially linear thermoplastic and some cross-linked plastic materials are capable of being reflowed in accordance with the present invention. The more notable materials within the scope of the invention are the epoxides, the acrylates, urethanes, polyesters, polyethers, natural resins and rosins and the like.

A further aspect of the present process is a method for continuously coating and reflowing. Said method comprises introducing a substrate to be coated, said substrate being at a temperature below, at or above the temperature of the solvent in the zone, into a zone of saturated vapors of a solvent maintained at its atmospheric boiling point; maintaining the substrate within said zone for a time sufficient to raise its surface temperature to the boiling point of the solvent from which the coating is to be applied (preferably the same solvent is used throughout); and, while either in said zone or the next zone, applying a solvent-soluble coating to said substrate by any suitable means; next, if coating is performed in the saturated zone or if the coating is to be applied in the next zone, introducing the substrate into an intermediate zone which contains an atmosphere of superheated vapors of the solvent; maintaining the thusly coated substrate in said superheat zone for a time sufficient for the coating solvent to be vaporized, thereby substantially removing all solvent from the coated surface; next, introducing the coated substrate into a zone of saturated vapors of a solvent maintained at or above its atmospheric boiling point, and maintaining said substrate within said zone for a time sufficient for at least a molecular layer of the vapors to absorb into the surface; introducing said substrate into a zone of superheated vapors of said solvent for a time sufficient for its surface temperature to be raised to at least about the temperature of said superheated vapors; and withdrawing said object from the superheat zone into and through a zone of saturated vapors of the solvent, without delay, and then into the ambient atmosphere.

In accordance with this aspect of the invention, then, it is now possible to solvent paint or coat and reflow said paint or coating, resulting in a very smooth finish free from flaws, without loss of solvent.

This process permits recovery of the solvents employed by virtue of its ability to be operated in, for instance, an apparatus similar to that described above for reflowing.

FIG. 2 illustrates one embodiment of an apparatus for carrying out the coating and reflow. In most respects the apparatus shown is a five-chambered version of FIG. 1. The operations in each chamber are as follows:

Zone A—The saturated solvent vapors raise the substrate's surface temperature to the solvent's atmospheric boiling point. If condensation occurs on the surface, this will scour the surface and prepare it for the coating operation;

Intermediate Zone—The heated substrate is then painted or coated by any suitable method, such as spraying, padding, dipping, etc. The coatings above named are suitable. This zone may be either a saturated or superheated vapor zone;

Zone B—The superheated vapors herein cause the coating vapors to be driven off, and the coating "dries";

Zone C—The saturated vapors herein reflow the coating;

Zone D—The superheated vapors herein cause the vapors absorbed in the reflow zone to be driven off; and Zone E—The saturated vapors herein are a vapor lock.

SPECIFIC EMBODIMENT

A metal panel was coated with an acrylic lacquer-based paint having the following composition:

1 part $TiO_2$ pigment
2.3 parts Acryloid B-72® brand plastic lacquer-polymer of esters of acrylic and methacrylic acids
A sufficient amount of methylene chloride to yield a sprayable paint After being dried at about 80° C., the coated panel was scratched to simulate surface flaws and which had cooled to about 40° C., was lowered in the test apparatus of FIG. 3, first contacting a saturated atmosphere of methylene chloride, the temperature of said zone being about 40° C. It was noted that solvent vapor was absorbed into the paint surface and reflow of said surface occurred.

About 2 minutes after introduction, the panel was further lowered into a superheated atmosphere of methylene chloride which was at about 80° C., whereupon the solvent absorbed by the paint was desorbed. When the panel's surface reached the temperature of the surrounding solvent (after about 90 seconds), the panel was again raised through the saturated vapor zone, and removed from the apparatus. It was then noted that the paint was substantially free of methylene chloride, and that the scratches had reflowed resulting in a smooth surface.

In another embodiment, a panel was lowered into the superheated zone of the apparatus of FIG. 3, the panel coated with a paint as described above, raised into the saturated vapor zone, then relowered in the superheated zone and finally raised out of the apparatus into the ambient atmosphere. A smooth level coating of high gloss was obtained.

Other experiments were run employing a clear polyurethane coating composition, viz, with equally good reflow results both when painting was done in the atmosphere of the superheated zone.

Equally good results are obtainable when the painting or coating is done at ambient temperature and the coated surface raised to a temperature of about the saturated reflow zone.

It is to be understood that the reflow results are obtained regardless of the manner of forming the coating or surface. For example, the process of the present invention is applicable to reflowing articles coated by powder coating technology.

I claim:

1. A method for reflowing plastic surfaces which comprises introducing an object which is made of a plastic material or has a plastic surface, said object having a surface temperature below, at or above the temperature of a solvent vapor in a first zone, into (A) a first zone of saturated solvent vapors, said vapors being maintained at their atmospheric boiling point;
(B) maintaining said object in said first zone for a period of time sufficient for at least a molecular layer of solvent to be absorbed into the plastic surface of said object;
(C) withdrawing said object from said first zone and introducing it into a second zone of superheated vapors of the same solvent as utilized in the first zone;
(D) maintaining said object in said second zone for a period of time sufficient to at least raise the surface temperature of said object to about the temperature of the superheated vapors, thereby removing, by vaporization, substantially all the solvent absorbed into the surface in the first zone;
(E) withdrawing said object from said second zone into a third zone of saturated vapors of the same solvent as previously used, said vapors being maintained at their atmospheric boiling point; and
(F) without delay, removing said object into the ambient atmosphere, whereby the surface imperfections of said object are at least substantially reduced.

2. A method for coating an object with a plastic material, and reflowing said coating, which comprises introducing an object to be coated, said object having a surface temperature below, at or above the temperature of the solvent vapor in the first zone, into (A) a first zone of saturated solvent vapors, said vapors being maintained at their atmospheric boiling point;
(B) maintaining the object in said first zone for a period of time sufficient to raise its surface temperature to the boiling point of the solvent from which the coating is to be applied;
(C) withdrawing said object from said first zone and introducing it into an intermediate zone and, while in said intermediate, applying a solvent-soluble plastic coating to said object, said zone containing an atmosphere of either saturated or superheated vapors of the same solvent as used in the first zone;
(D) withdrawing said coated object from said intermediate zone and introducing it into a zone of superheated vapors of the same solvent as previously used;
(E) maintaining said object in said zone of superheated vapors for a period of time sufficient for substantially all the coating solvent to be vaporized;
(F) withdrawing said object from said zone of superheated vapor and introducing it into a zone of saturated solvent vapors, said vapors being maintained at or above their atmospheric boiling point;
(G) maintaining said object in said zone of saturated vapors for a period of time sufficient for at least a molecular layer of solvent to be absorbed into the plastic surface of said object;
(H) withdrawing said object from said zone of saturated vapor and introducing it into a zone of superheated vapors of the same solvent as previously used;
(I) maintaining said object in said zone of superheated vapors for a period of time sufficient to at least raise the surface temperature of said object to about the temperature of the superheated vapors, thereby removing, by vaporization, substantially all the solvent absorbed into the surface in step G,
(J) withdrawing said object from said zone of superheated vapors into a zone of saturated vapors of the same solvent as previously used, said vapors being maintained at their atmospheric boiling point; and
(K) without delay, removing said object from said last zone into the ambient atmosphere, whereby, the surface is coated and the coating reflowed thereby removing or substantially reducing the surface imperfections.

References Cited

UNITED STATES PATENTS

| | | | |
|---|---|---|---|
| 2,590,849 | 4/1952 | Dungler | 117—119.8 |
| 3,443,008 | 5/1969 | Boyhan et al. | 264—341 |
| 2,294,479 | 9/1942 | Peter | 264—341 |

FOREIGN PATENTS

| | | | |
|---|---|---|---|
| 615,179 | 1949 | Great Britain | 264—341 |

ROBERT F. WHITE, Primary Examiner

G. AUVILLE, Assistant Examiner

U.S. Cl. X.R.

117—63; 264—341